United States Patent
Sevostianov

(10) Patent No.: US 10,949,980 B2
(45) Date of Patent: Mar. 16, 2021

(54) SYSTEM AND METHOD FOR REVERSE OPTICAL TRACKING OF A MOVING OBJECT

(71) Applicant: ALT LLC, Moscow (RU)

(72) Inventor: Petr Vyacheslavovich Sevostianov, Voronezh (RU)

(73) Assignee: ALT LLC, Moscow (RU)

( * ) Notice: Subject to any disclaimer, the term of this patent is extended or adjusted under 35 U.S.C. 154(b) by 267 days.

(21) Appl. No.: 16/174,485

(22) Filed: Oct. 30, 2018

(65) Prior Publication Data
US 2020/0134839 A1 Apr. 30, 2020

(51) Int. Cl.
*G06T 7/246* (2017.01)
*H04W 4/029* (2018.01)

(52) U.S. Cl.
CPC ............ *G06T 7/246* (2017.01); *H04W 4/029* (2018.02)

(58) Field of Classification Search
CPC ...... G06T 7/246; H04W 4/029; H04W 4/027; H04W 4/00; G06F 2203/012; G06F 3/012; G06F 3/014
See application file for complete search history.

(56) References Cited

U.S. PATENT DOCUMENTS

| | | | |
|---|---|---|---|
| 2003/0095186 A1* | 5/2003 | Aman | G06T 7/292 348/162 |
| 2007/0081695 A1* | 4/2007 | Foxlin | G06T 7/73 382/103 |
| 2009/0046152 A1* | 2/2009 | Aman | G06K 9/3216 348/157 |
| 2010/0295754 A1* | 11/2010 | Cernasov | G06F 3/0325 345/8 |
| 2013/0064427 A1* | 3/2013 | Picard | A61B 34/20 382/103 |
| 2014/0376768 A1* | 12/2014 | Troy | G06K 9/3241 382/103 |
| 2016/0252965 A1* | 9/2016 | Mandella | A63F 13/20 345/156 |
| 2017/0011555 A1* | 1/2017 | Li | G06T 1/60 |
| 2017/0018121 A1* | 1/2017 | Lawson | G06T 17/00 |
| 2019/0187783 A1* | 6/2019 | Sevostianov | A63F 13/53 |

* cited by examiner

*Primary Examiner* — Wesley J Tucker
(74) *Attorney, Agent, or Firm* — Bardmesser Law Group

(57) ABSTRACT

Method and system for tracking a moving object may be used in virtual or augmented reality systems, in-site logistics systems, robotics systems and control systems of unmanned moving objects. The method of tracking includes a step of automatic adjusting a tracking area by detection and registration of unique combinations of elementary optical patterns, and a step of tracking change in position and/or orientation of a moving object by detection of unique combinations of elementary optical patterns and comparison thereof with the unique combinations of elementary optical patterns registered during the tracking area adjustment. The system for tracking a moving object comprises at least one tracker located on a moving object the tracker including an optical sensor, at least one marker strip including active markers forming elementary optical patterns in a picture obtained from the optical sensor, and a central processing unit.

20 Claims, 17 Drawing Sheets

| | | | | | | |
|---|---|---|---|---|---|---|
| | | | | | | |
| | | | | | | |
| ... | | | | | | |
| 7 | 8 | 9 | 10 | 11 | 12 | 13 |
| 0 | 1 | 2 | 3 | 4 | 5 | 6 |

Pattern direction codes

SYSTEM AND METHOD FOR REVERSE OPTICAL TRACKING OF A MOVING OBJECT

BACKGROUND OF THE INVENTION

Field of the Invention

The invention relates to a method and a system for tracking a moving object. It may be used in virtual or augmented reality systems, in-site logistics systems, robotics systems, control systems of unmanned moving objects and other kinds of industrial, scientific, training systems, etc.

Description of the Related Art

Tracking a moving object is used in many applications, for instance, in VR (Virtual Reality) systems, AR (Augmented Reality) systems, in-site logistics systems (e.g., related to production, warehouse or store logistics), robotics systems, control systems of unmanned moving objects (e.g., related to vehicles), etc. In the following description, tracking means of VR/AR systems are mostly considered; however, the claimed tracking concepts are substantially the same for all of the above-mentioned systems.

Based on configuration of tracking systems, tracking concepts may be classified into outside-in tracking, where a sensor or plural sensors are located in a space outside a tracked object, while a reference point or multiple reference points (e.g., markers) are located on the tracked object, and inside-out tracking, wherein a sensor or multiple sensors are located on a tracked object, while a reference point or multiple reference points are located in a space outside the tracked object.

Based on sensor type, tracking concepts may be classified into optical tracking, where optical sensors (e.g., cameras operable in visible light or infrared range) are used, and inertial tracking, wherein inertial sensors (e.g., gyroscopes and accelerometers) are used. Moreover, magnetic field sensors (i.e., magnetometers), height sensors (i.e., altimeters) and sensors of some other types may also be used in tracking systems.

Additionally, there are tracking systems using centralized positioning systems including global or local, satellite-based or terrestrial ones. Moreover, there are marker-free tracking systems, including those based on simultaneous localization and mapping (SLAM) approach.

Most of tracking systems used in game, entertainment and training VR/AR systems are combined tracking systems. In particular, optical-inertial tracking systems are widely used; they are based on combined application of both optical and inertial sensors, which allows complementing each other and balancing their drawbacks.

Fast and precise determination of a tracking area is important for inside-out optical and optical-inertial tracking systems, where a video camera is located on a moving object, and optical light-emitting or light-reflecting markers (which are reference points for optical tracking) are fixedly installed in the tracking area (a site or a room) in a predetermined manner.

When a tracking area is fixed (i.e., predetermined), a tracking system has to provide a fast selection of configuration options for the racking area and loading parameters thereof. When a tracking area is variable (i.e., when shape and size of the tracking area is not known in advance), a tracking system has to provide a fast and precise adjustment of the racking area. It is highly preferable to avoid a need for calibration of the tracking system prior to start of its operation, or to provide as much automated calibration as possible.

Published patent applications US2008285854A1, US2013106833A1, US2017086941A1, WO2014199196A1, WO2017050761A1 show a general view of the prior art in the field of tracking systems.

Published patent applications DE102015013551A1, EP1645241A1 (US2006082789A1), EP2339537A1, US2017168592A1 and U.S. Pat. No. 6,787,750B1 disclose using active IR markers in tracking systems. U.S. Pat. No. 6,787,750B1 also discloses automatic determination of a racking area.

Published patent applications US2011079703A1, US2017358139A1 disclose tracking systems using an optical sensor (a camera) and an inertial sensor (a gyroscope or an accelerometer) mounted on a moving object.

Published patent applications EP2012170A1, US2004080548A1 disclose using active IR markers in tracking systems including an optical sensor (a camera) and an inertial sensor (a gyroscope or an accelerometer) mounted on a moving object.

Published patent applications WO2007102857A2, WO2016102721A1 disclose using active IR markers in tracking systems including an optical sensor (a camera) and an inertial sensor (a gyroscope or an accelerometer) mounted on a moving object, and recognition of optical patterns formed by fixed markers.

Published patent application WO2016187609A1 discloses recognition of optical patterns formed by fixed markers. Published patent application WO2013071981A1 discloses using active IR markers in tracking systems including an optical sensor (a camera) and an inertial sensor (a gyroscope or an accelerometer) mounted on a moving object, and recognition of optical patterns formed by fixed markers.

Non-patent document [1] discloses detection of a linear pattern formed by four light-reflecting markers, and a planar pattern. The detection is performed by two cameras (outside-in tracking).

Non-patent document [2] discloses detection of a linear pattern formed by four light-reflecting markers, and a planar pattern. The detection is performed by multiple cameras (outside-in tracking).

Non-patent document [3] discloses using complex contrast planar markers in VR systems based on general-purpose wearable devices.

Non-patent document [4] discloses detection of various patterns (ranging from a one-point marker to a multiple-point three-dimensional marker) formed by light-reflecting markers, using multiple cameras (outside-in tracking).

Non-patent document [5] discloses a method of detection and identification of light-reflecting IR markers by a point cloud (an outside-in point-cloud-based tracking method), using multiple cameras.

Non-patent document [6] discloses using Kalman filters for detection and identification of light-reflecting IR markers with application of multiple cameras with no detection of patterns (outside-in tracking).

Non-patent document [7] discloses using color light-reflecting markers for motion capture, followed by formation of a 3D-model for 3D animation (outside-in tracking).

Non-patent document [8] discloses using complex contrast planar markers in an inside-out optical tracking.

Non-patent document [9] discloses using linear patterns formed by a plurality of light-emitting diodes mounted on a ceiling, with use of one camera (inside-out tracking); a possibility of scaling the tracking area is mentioned.

Non-patent document [10] discloses using a planar pattern having concentrically placed markers for optical tracking of any kind.

Non-patent document [11] discloses using time modulation of emission strength of LED markers for optical tracking of any kind.

Non-patent document [12] discloses using Wii remote for outside-in tracking a user of a wireless headset equipped with four light-emitting diodes forming a rectangular planar optical pattern, for providing a realistic dynamic sound field.

The technical solution of the non-patent document [9] is the closest art to the claimed invention;

it uses LED strips installed on a ceiling evenly over its area. Such a strip has repeated sequence of linear patterns based on De Bruijn sequence transformed into a cyclic Manchester code.

However, according to the above-cited patent and non-patent documents, there is no solution to a problem of automatic adjustment of a tracking area using a plurality of optical markers of the same type, formed by fixed IR markers installed in a predefined manner at a site or in a room and thus limiting an operational area, with use of inside-out optical or optical-inertial tracking a movable object, when a tracker is mounted on the movable object, and the tracker includes an optical sensor and (optionally) an inertial sensor. It should be noted, that this problem was never even defined in the prior art.

Currently, there are no any tracking systems on the market, which would provide this function and would be used in virtual or augmented reality systems for game, entertainment or training purpose. Also, the inventor of the claimed solution is not aware of any tracking systems having such a function, which would be used in production, warehouse or store logistics systems, robotics systems, control systems of human-controlled or unmanned moving objects, etc.

SUMMARY OF THE INVENTION

For any system for tracking a moving object, especially for a VR/AR tracking system, it is important to make the system ready to operate as fast as possible after its switching on, rebooting, changing configuration or changing operational scenario. If the tracking area is fixed (predefined), the tracking system is required to provide fast configuration selection for a particular tracking area and fast loading its parameters. If the tracking area is variable (i.e., when form and size of the tracking area is not known in advance), the tracking system is required to provide fast and precise adjustment of the tracking area. It is highly preferable to allow avoiding calibration of the tracking system or at least implementing as much automated calibration procedure as possible.

The problem of automatic adjustment of the tracking area for inside-out optical or optical-inertial tracking a movable object, when a tracker is mounted on the movable object, and the tracker includes an optical sensor and (optionally) an inertial sensor is solved using a method and a system for tracking a moving object, according to the invention.

A method of tracking a moving object includes the following steps:

a step of automatic adjustment of a tracking area, including detection and registration of unique combinations of elementary optical patterns;

a step of tracking change in position and/or orientation of a moving object, including detection of unique combinations of elementary optical patterns and comparison thereof, with the unique combinations of elementary optical patterns registered during the adjustment of the tracking area.

The adjustment of the tracking area may include the following steps:

(S1) defining the tracking area;
(S2) determining a size of a tracking window and placing the tracking window in an initial position;
(S3) defining the elementary optical patterns formed by markers within the tracking window;
(S4) forming an ID of a "constellation" candidate;
(S5) verifying uniqueness of each "constellation" candidate and labelling the ID of the "constellation" candidate if it is not unique;
(S6) recording the ID of the "constellation" candidate into a "constellation" table;
(S7) rotating the tracking window by a predefined angle;
(S8) performing the steps S2-S6 for the rotated tracking window;
(S9) verifying if a required number of rotations has been performed and repeating the steps S7, S8, when necessary;
(S10) shifting the tracking window by a predefined pitch;
(S11) performing the steps S2-S9 for the shifted tracking window;
(S12) verifying if the tracking area has been entirely covered and repeating the steps S10, S11, when necessary;
(S13) deleting the non-unique IDs of the "constellation" candidates from the "constellation" table.

The steps S4, S5, S6 and S13 may be performed for each ID of the "constellation" candidate and for each ID of its child "constellation" candidates. A projection of the tracking area may be divided into cells prior to the step S2, and the size of the tracking window may be denominated in a number of the cells in the step S2.

Tracking change in position and/or orientation of the moving object may include the following steps:

(S21) reading a picture from an optical sensor located on the moving object and performing a preprocessing the picture;
(S22) detecting the elementary optical patterns formed by markers within the tracking window;
(S23) forming an ID of a "constellation";
(S24) identifying the formed ID of the "constellation" using a "constellation" table;
(S25) determining position and orientation of the moving object, based on the "constellation" identified in the step S24.

The step S21 may include the following steps:
(S31) reading the picture from the optical sensor;
(S32) compensating geometric distortions of the read picture;
(S33) optionally projecting the picture onto an operational plane;
(S34) normalizing the picture;
(S35) allocating the tracking window in the picture.

The step S22 may include the following steps:
(S41) in the tracking window, arbitrary selecting three points corresponding to the markers;
(S42) determining two reference points among the selected three points;
(S43) for the reference points, determining a nominal position of a third point, according to an elementary optical pattern;

(S44) determining a deviation value δ between an actual position of the third point and the nominal position of the third point;

(S45) verifying the deviation value δ; if the deviation value δ does not exceed a predefined threshold value, then (S46) listing a combination of the three points in a list of elementary optical pattern candidates, if the deviation value δ exceeds a predefined threshold value, then (S47) the combination of the three points is discarded;

(S48) verifying if all possible combinations of three points have been processed and repeating the steps S41-S47, when necessary;

(S49) sorting out the list of elementary optical pattern candidates, based on the deviation value δ;

(S50) selecting an elementary optical pattern candidate having a least deviation value δ from the list of elementary optical pattern candidates;

(S51) verifying if any used points are present in the elementary optical pattern candidate; if at least one used point exists therein, then (S52) the elementary optical pattern candidate is discarded; if no used points exist therein, then (S53) the elementary optical pattern candidate is listed in a list of valid elementary optical patterns; all points of the listed elementary optical pattern are labelled used;

(S54) performing the steps S50-S53 for remaining elementary optical pattern candidates.

A system for tracking a moving object comprises:

at least one tracker located on a moving object (e.g., on a user of a VR/AR system), while the tracker includes an optical sensor;

at least one marker strip including active markers forming elementary optical patterns in a picture obtained from the optical sensor;

a central data processing device partially performing the method of tracking a moving object, as discussed above.

The optical sensor may be a matrix optical sensor. At least part of the marker strips may be located on a floor or other base structure. The marker strips may be integrated into puzzle floor mats. At least part of the marker strips may be located on ceilings, walls, beams, masts, etc., or installed in any other manner above the floor or other base structure within the tracking area.

The active markers may be infrared light-emitting markers. The elementary optical pattern may be a linear elementary optical pattern or a non-linear elementary optical pattern. The tracker may comprise a local data processing device partially performing the method of tracking a moving object, as discussed above.

The tracker and the central data processing device may be connected by a wireless data transmission link configured for transmitting adjustment data during the step of automatic adjustment of the tracking area during the step of tracking in the method of tracking a moving object, as discussed above.

The tracking system may be configured to adjust the tracking area automatically by detecting and registering unique combinations of elementary optical patterns, according to the above method. The tracking system may be configured to track change in position and/or orientation of the moving object by detection of unique combinations of elementary optical patterns and by comparison thereof with the unique combinations of elementary optical patterns registered during the adjustment of the tracking area, according to the above method.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF EMBODIMENTS OF THE INVENTION

Reference will now be made in detail to the preferred embodiments of the present invention, examples of which are illustrated in the accompanying drawings.

The tracking area of VR/AR systems may be subject to change, in particular, the shape and size of the tracking area may be changed during a lifetime of the VR/AR system due to its transferring to another site or another room, due to change in the number of users, or according to a scenario of the VR/AR system (e.g., a gameplay). Change in shape and size of the tracking area requires adjustment of the tracking system. In mobile VR/AR systems, adjustment of the tracking system is needed each time when the system is deployed. In the tracking system of this invention, the problem of automatic adjustment of the tracking area is solved, and tracking accuracy and reliability are improved, even in a multi-user mode of operation of the VR/AR system.

In an inside-out optical-inertial tracking system, a device providing tracking (a tracker) is placed on a movable object to be tracked, while light sources (active markers) forming particular combinations (optical patterns) in a picture captured by the tracker are fixed and located within operational area of the VR/AR system. The VR/AR system may include one or multiple trackers; each tracker allows determining position and orientation of a corresponding movable object (or a part thereof), independently of the other trackers.

Figure 1:
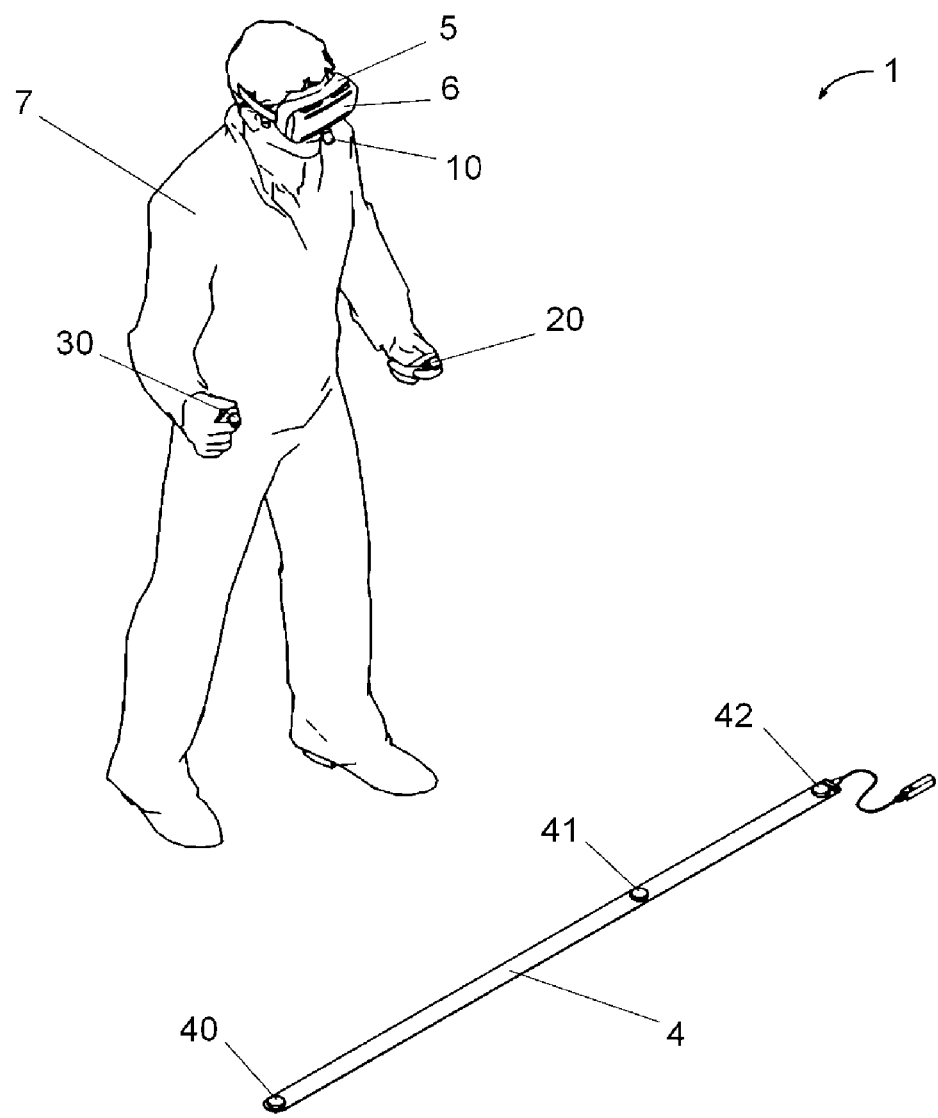
FIG. 1 shows an example of implementation of a VR/AR system, according to the invention.
Figure 2:
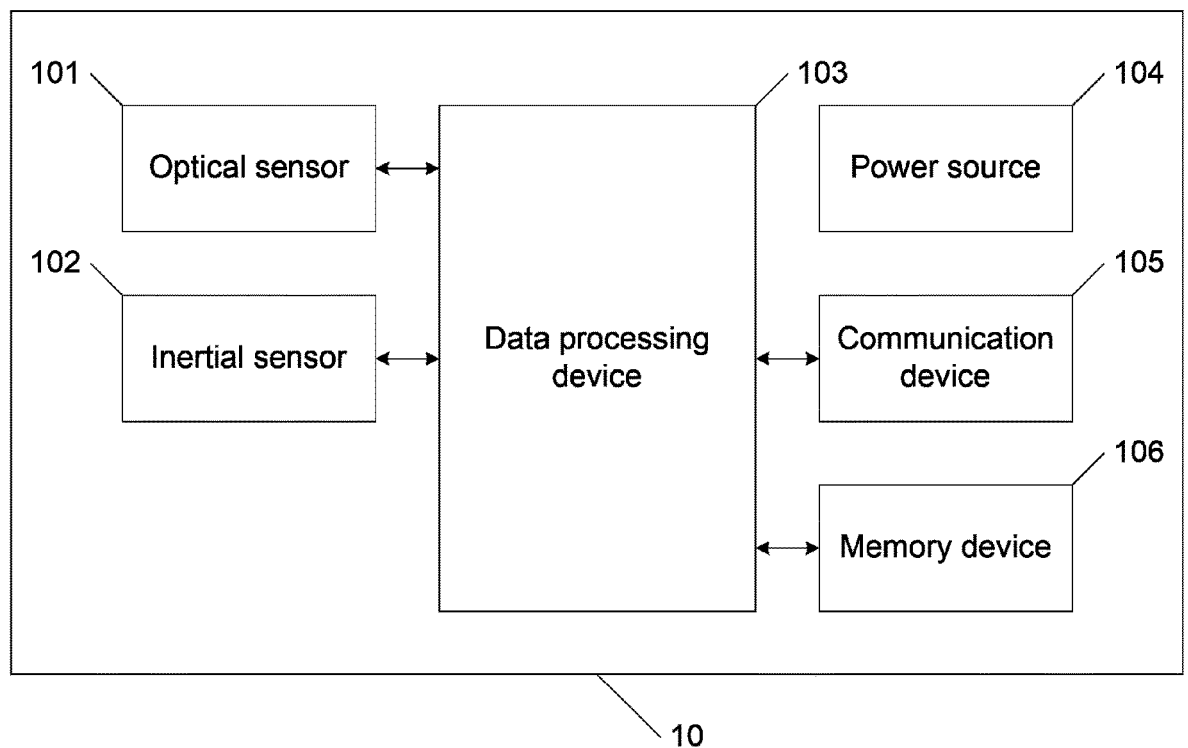
FIG. 2 shows a block diagram of a tracker.

FIG. 1 shows an implementation example of a VR/AR system 1 including a head-mounted display (HMD) 5 in a form of a helmet or AR glasses, a tracker 10 located on the HMD 5, a central data processing device (host) 6, also located on or in the HMD 5, a tracker 20, a tracker 30 and a marker strip 4 including active markers 40, 41, 42. The HMD 5 provides presenting an image generated by the system 1 to a user 7, where the image is generated, based on tracking data acquired from the trackers 10, 20, 30. The image presented to the user may be a virtual reality 3D image or an augmented reality 3D image. The tracking data generated by the trackers 10, 20, 30 includes data on spatial positions of the trackers and, therefore, of corresponding body portions of the user 7, data on orientation of the trackers and their motion parameters, namely, direction, speed and acceleration.

The tracker 10 includes an optical sensor 101 and one or more inertial sensors 102.

The tracker 10 also includes a data processing device 103 for processing tracking data. The data processing device 103 provides synchronization of all sensors, acquisition of data from the optical sensor, one or more inertial sensors, processing data of the optical sensor to form information on markers found in the picture. The tracker 10 also includes a power source 104, a communication device 105, a memory device 106 and other parts necessary for its operation as a part of the VR/AR system 1. The tracker 10 is connected to the central data processing device 6 via a wireless link like WiFi, Bluetooth, etc. to transfer adjustment data and tracking data.

The tracker 20 and the tracker 30 may be the same as the tracker 10, or they may have some differences, according to different manner of movements of the corresponding user's body portions. In particular, the trackers 20 and 30 connected to game controllers in the user's hands may be capable of tracking more fast and jerky movements, than the tracker 10 located on the user's head. However, the main operational concept of the tracking system remains substantially the same. Various implementations of trackers are discussed in earlier published patent application PCT/IB2017/058068 and U.S. patent application Ser. No. 15/844,967 owned by the applicant, both incorporated herein by reference in their entirety. Configuration of the optical sensor suitable for use in this invention is discussed in published patent application PCT/RU2014/001019 and U.S. patent application Ser. No. 15/540,313 owned by the applicant, and both incorporated herein by reference in their entirety.

The marker strip 4 (FIG. 3) includes a base in a form of a narrow flexible strip made of a polymer material, with flexible conductors providing power supply to the active markers 40, 41, 42. The base material may be a woven or non-woven material. Flexibility of the base and the conductors ensures compact size of the marker strip in its rolled-up state during storage and transportation (FIG. 4); however, this arrangement ensures its sufficient transversal rigidity (in its installation plane) and constant distance between the markers, which is necessary for providing a stable optical pattern. The conductors may be metallic, metallized, oxide, composite, based on a thick-film or thin-film technology, so as to provide a supply of a safe voltage at a value of power consumption of about a few watts. The active markers 40, 41, 42 may be fastened to the base by any suitable way so as to provide a reliable attachment thereof to predefined places and feed of the supply voltage. In an illustrative embodiment of the invention, flat strip metal conductors are used, and the active markers 40, 41, 42 are fastened to the base by magnet connectors providing fast and easy mounting the markers onto the base and dismantling therefrom, while ease of dismantling the markers protects the marker strip 4 against damage, when a user unintentionally contacts the markers physically. Power is supplied to the markers 40, 41, 42 from a power source 45 via a cable 44 and an electrical connector 43.

In an illustrative embodiment of the invention, the active markers 40, 41, 42 are light-emitting IR markers. In other embodiments of the invention, the active markers 40, 41, 42 may be operational in other frequency ranges, e.g., in the visible light range.

The power source 45 may be any mains-connected or off-line power source, which provides a required safe AC or DC voltage (e.g., 5, 6, 12, 24, 36 or 48 V). For example, a 5 VDC or a 12 VDC battery like a PowerBank often used for supplying/charging mobile devices or a 12.6 VDC battery like a Booster intended for facilitating start of a car engine when a main battery is discharged may be employed as the off-line power source. If multiple marker strips 4 are used in the system 1, the power supply may be provided in a centralized manner by a single power source; alternatively, the power supply may be provided in a distributed manner, when each marker strip 4 is fed by a separate power source. A centralized power supply may be preferable for permanent commercial VR/AR systems, particularly, when the marker strips 4 are built-in into the floor or located on the walls or the ceiling of the room. A distributed power supply may be preferable for mobile amateur VR/AR systems, particularly, suitable for outdoor use.

The cable 44 and the electrical connector 43 may be of any suitable type. Choosing thereof is a trivial task for an artisan, so this point is omitted.

Each of the markers 40, 41, 42 is an IR LED emitter having a near-semispherical directional characteristic. The required directional characteristic is ensured by placement and orientation of one or more LED chips, as well as by use of a light diffuser, e.g., based on a Fresnel lens. The marker may include a driver providing operational capability of the LED emitter in a wide range of supply voltage.

A combination of the markers 40, 41, 42 located in a predefined manner forms an elementary optical pattern (hereinafter it may be called an "elementary pattern" for brevity), which presence and spatial position is detected by the central data processing device 6, based on marker data available in a data flow from the tracker 10. The use of active (i.e., light-emitting) markers is preferable in the inside-out tracking concept; this provides a number of advantages in comparison with the use of passive (light-reflecting) markers. In particular, when active markers are used, no additional power supply for the tracker is needed for illuminating passive markers; this is of particular importance when the tracker is placed on a movable object. The available tracking area size is defined by dimensions and brightness of the markers. Powering the markers by mains-connected or off-line power source(s) allows multiply increasing emission power of the markers, thus expanding the tracking area size, whereas a power consumption of the tracker itself is not changed.

Figure 3:
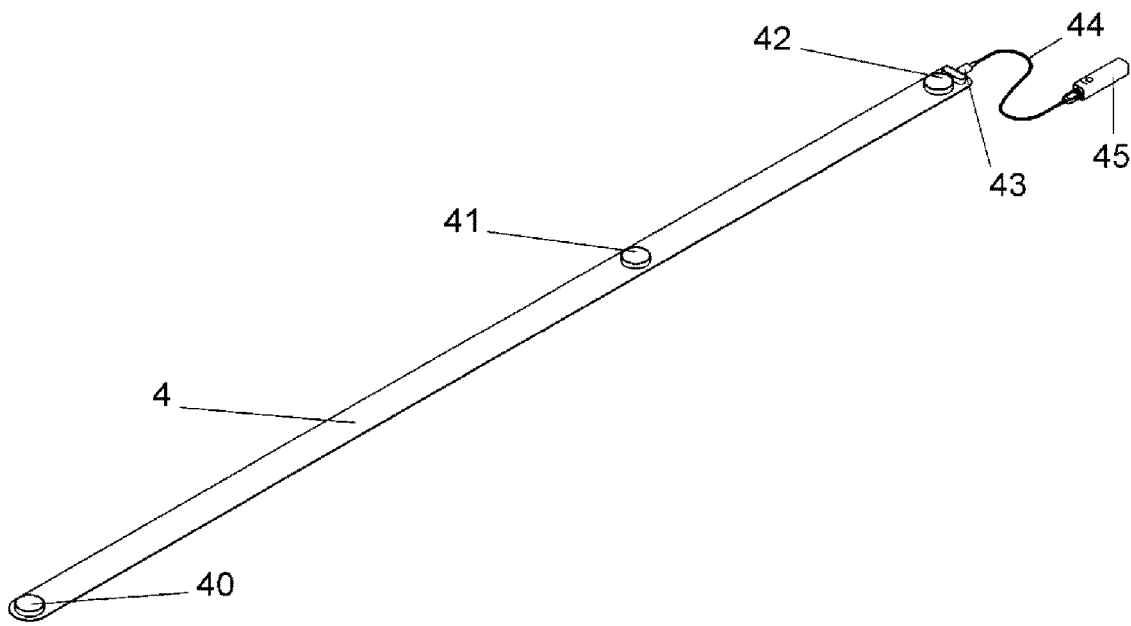
FIG. 3 shows an example of a marker strip in a deployed state.
Figure 4:
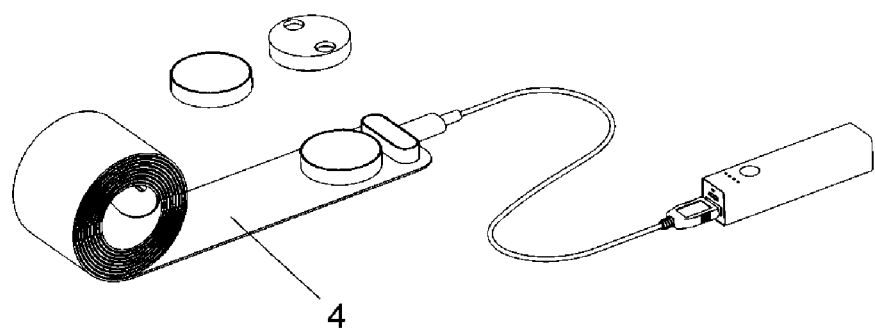
FIG. 4 shows an example of a marker strip in a coiled state.

The elementary pattern may be a linear pattern, which is detected by a marker data processing algorithm. The linear pattern is characterized by a predefined ratio of distances between markers. In particular, in an embodiment of the invention, where three markers are disposed in a line and form a sequence 40-41-42, as shown in FIG. 3, the distance between the markers 40 and 41 is twice the distance between the markers 41 and 42. The distance ratio may be different, as long as reliable identification of the elementary pattern is maintained in the system.

The operational area may be scaled by increasing a length of the marker strip 4, while the distance ratio is maintained and luminescent surface of the markers and their brightness are large or high enough. This allows expanding the operational area substantially, while providing high tracing parameters, as long as angular and luminosity parameters of the marker blobs within the optical sensor frame are maintained.

The elementary pattern may be a linear pattern having more markers, e.g., four, five, etc. markers. The elementary pattern may also be a non-linear pattern, i.e., the markers may be disposed not in a line.

In addition to the above method of increasing the operational area, there is a possibility of almost unlimited scaling the operational area by way of adding marker strips. In this case, combinations of elementary patterns are added to the entire tracing picture, instead of combinations of individual markers. Thus, the system detects presence of predefined elementary patterns in a frame and then determines disposition of the patterns relative to each other. This allows defining a combination of elementary patterns, so as to ensure unambiguous determination of the tracker position by the tracking system within the operational area, based on a map of elementary patterns, which is defined during adjustment of the tracking system. This approach may be used for arranging either an operational area of a simple shape disposed in one room, or an operational area of a complex shape, which may be distributed over multiple adjacent rooms.

Therefore, one of advantages of the invention is fast and easy scaling the tracking area by way of adding new marker strips and automatic adjustment the tracking area after such a scaling. In outside-in optical tracking systems, where markers are located on a movable object, additional cameras should be employed for expanding the tracking area, which is usually a complicated and expensive way. In the present invention, cost of marker strips is low and labor content of their installation is negligible.

Depending on a screenplay or a gameplay, the marker strips may be disposed on the floor, the walls or the ceiling of a premise. Combined options are also possible, when the marker strips are disposed on the walls and the ceiling, or on the floor and the walls. In stationary embodiments of the invention, the markers may be built-in into the floor, the walls or the ceiling. In transportable embodiments of the invention like exhibition samples, the markers may be built-in into a sectional dismountable floor, which is a part of an exhibition installation set. An option of installation of the marker strips on columns, beams, cantilevers and other support structures, including dismountable and movable ones.

As an alternative, in both fixed and movable embodiments of the invention, the marker strips may be arranged, using elastic sectional floor mats (puzzle floor mats, see FIG. 3), which are coupled to each other, when in an operational position, thus ensuring geometrical precision of arranging the operational area, its shape and dimensions stability, and therefore, facilitating the VR/AR system 1 set-up and adjustment. The markers may be mounted in predefined points of the floor mats. The predefined points may be apertures of corresponding shapes receiving the markers, while unused apertures may be closed with plugs made of the same material as the floor mat itself. When a centralized power supply is employed, supply wires may be disposed below the floor mats. The power supply wires may be of a flat strip shape, which design eliminates their appearance as irregularities on the working surface of the floor mats. Partnering the marker strips shown in FIG. 3 and the sectional floor mats is also possible.

Figure 6:
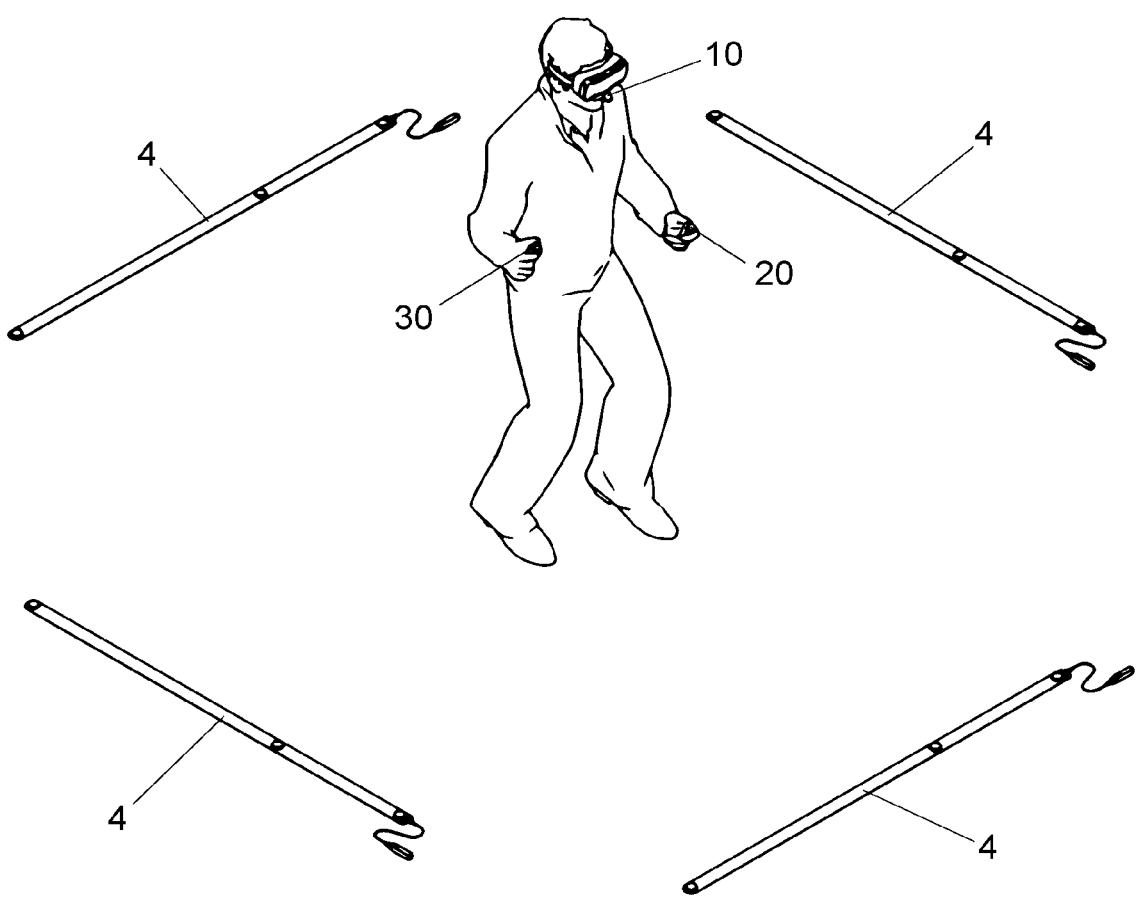
FIG. 6 shows an example of location of marker strips on the floor.

As for amateur use, where fast installation and easy application are key factors, a floor-based option may be preferable, so a user would be able to place the marker strips on the floor, arrange them into a near-rectangle shape and connect them to one or more power sources (FIG. 6). Installation of such a system usually takes not more than a couple of minutes.

Figure 7:
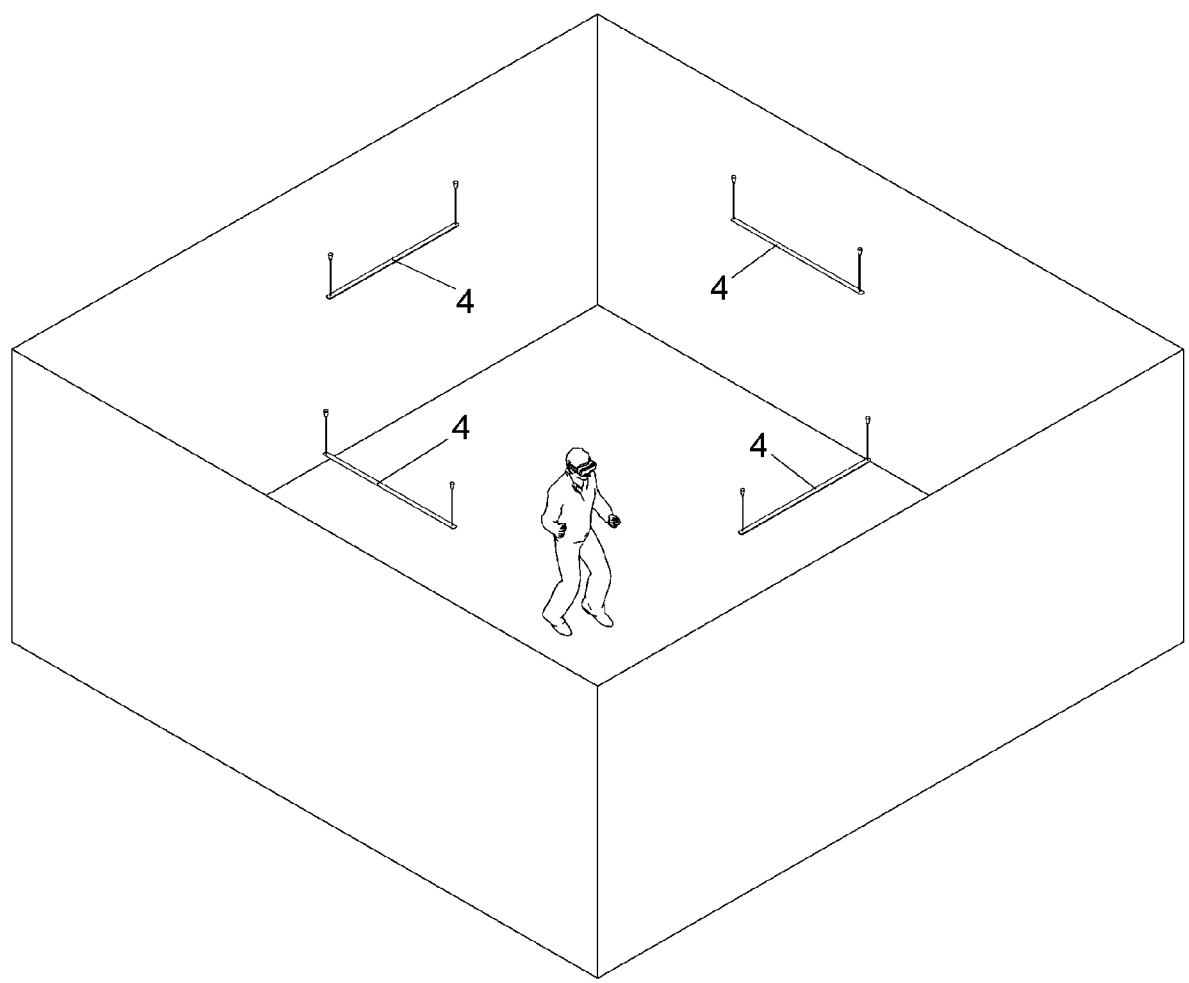
FIG. 7 shows an example of installation of marker strips on the ceiling.

As for commercial use, in particular, for VR-parks, it is important to dispose the marker strips out of reach of users, so their actions could not alter characteristics of the operational area, as defined during calibration and/or specified by the system setup parameters. Moreover, commercial VR/AR systems are often multi-user systems, therefore, it is expedient to take into account a possibility of shading the markers by users during their migrations within the operational area, when choosing disposition of the marker strips. In this case an option of placing the marker strips on the walls or ceiling (see FIG. 7, the ceiling is not shown) may be preferable. Note that the operational area size may be substantially greater than dimensions of a geometric figure outlined by the marker strips, if the marker strips are disposed on the ceiling. However, in this case a few extra markers located on the floor may be required for determination of the floor position relative to the marker strips;

alternatively, use of an additional calibration procedure may be required, e.g., by positioning one or more trackers on the floor during the calibration.

Principles of detecting elementary patterns during defining a fixed optical tracking area (i.e., when a calibration is not required) and during the tracking a movable object are discussed below, using a VR/AR system as an exemplary basis and implementation versions are outlined.

A tracking area is an area of space, where tracking a movable object is performed. According to the invention, in a VR/AR system, a tracked movable object may be a user or a user's body portion bearing a tracker, e.g., a user's head, arm or foot. The tracked movable object may also be an article held by a user, e.g., gripped by a user's hand. However, the tracked movable object may also be any other movable object like an endpoint of a robotic system, a loader or a vehicle of an in-site logistics system.

Figure 5:
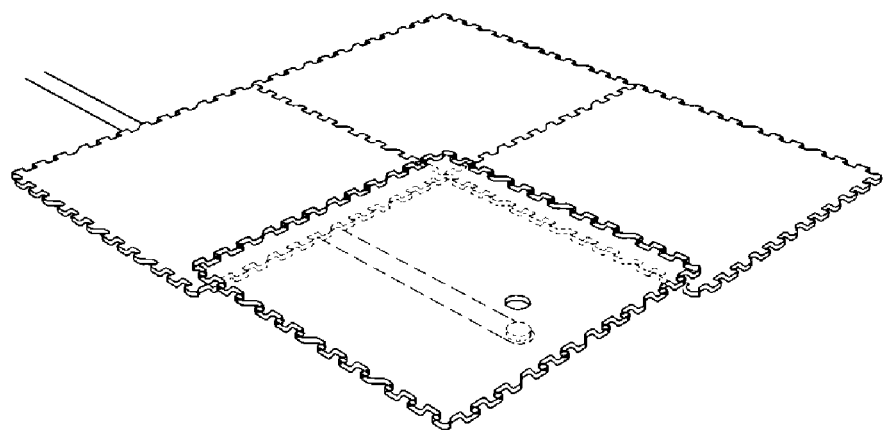
FIG. 5 shows an example of installation of markers using elastic puzzle floor mats.
Figures 8, 9:
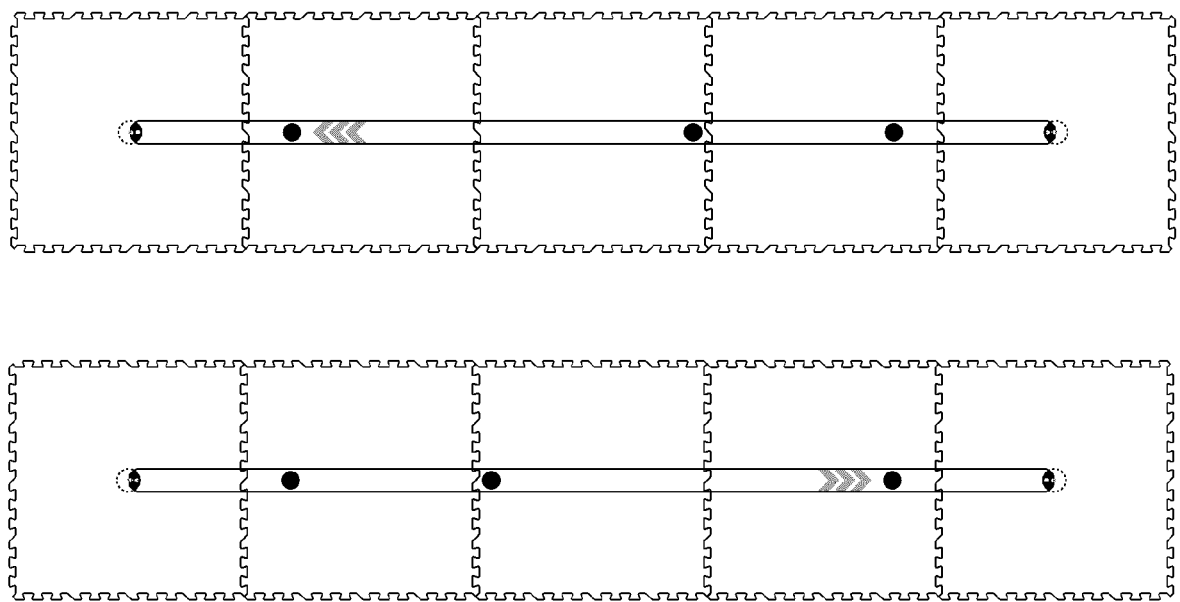
FIG. 8 shows location of a marker strip in elastic puzzle floor mats, wherein each puzzle piece corresponds to a cell of the tracking area.
FIG. 9 shows an example of numbering cells of the tracking area.

Tracking the movable object is performed within the tracking area. To define the tracking area automatically, a projection of the tracking area onto an operation surface (usually a horizontal plane) is divided into portions, i.e., cells, which may be shaped in various manners. The work surface may be, e.g., a floor surface or a ceiling surface. If an orthogonal coordinate system is used, square shape of the cells is preferable. The cell size is defined, based on engineering implementation of the VR/AR system, i.e., minimal and maximal size of the tracking area, accuracy of tracking to be maintained, marker type, kind and size of the elementary patterns formed by the markers, etc. In particular, if prefabricated puzzle floor mats (FIG. 5) are used, the cell size may be equal to the puzzle piece size, e.g., 60×60 cm. In this case, a marker strip of 1.5-meter length having three markers (as shown in FIG. 3) is located within three cells, while the markers may be differently positioned in the plane relative to each other, depending on orientation of the elementary pattern (FIG. 8). Orientation of the elementary pattern in FIG. 8 is provisionally indicated by arrows on the marker strip. It is to be understood that the marker strip length may be more or less than 1.5 meter and the marker strip may be placed within more or fewer number of the cells. For example, the marker strip corresponding to the elementary pattern may be placed within two cells, so density of the marker placement may be increased.

Figure 10:
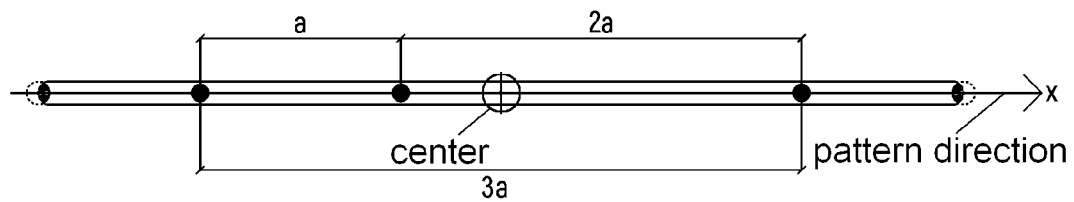
FIG. 10 shows an elementary optical pattern formed by a market strip, wherein its nominal center is marked with a circle and its nominal direction is indicated by an arrow; the direction may be designated by numerical designators (e.g., coded as 0, 1, 2, 3).
Figure 10:
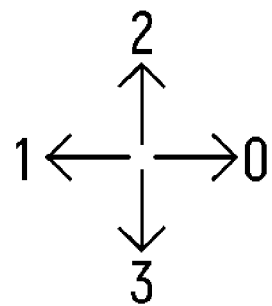
Figure 11:
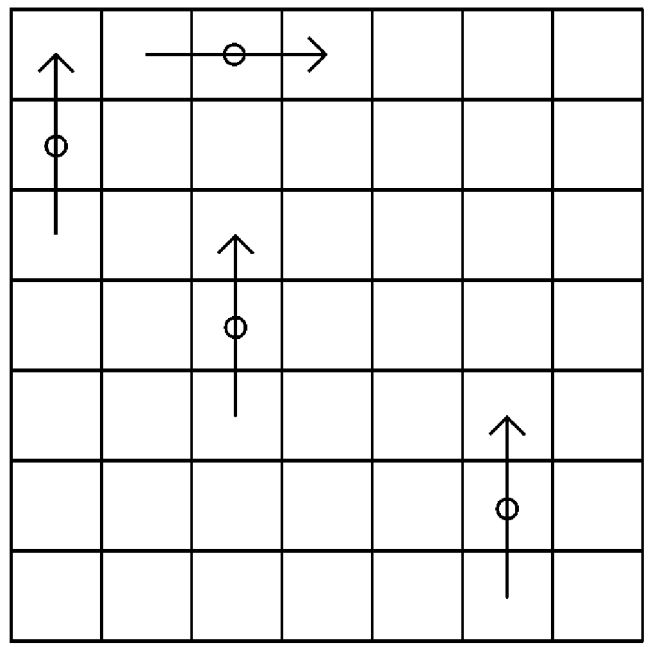
FIG. 11 shows an example of location of elementary optical patterns in a square tracking area.

Thus, the surface is divided into cells, each cell having its own coordinates. The cell coordinates may be defined in various ways, e.g., using Cartesian or polar coordinates. In an illustrative embodiment of the invention, the cells are numbered in a predefined manner and coordinates of each sell are unambiguously defined by its number. An example of cell numbering is shown in FIG. 9. Position of each elementary pattern in such a coordinate grid is defined by the number of a cell including the elementary pattern center and by direction of the elementary pattern. Provisional elementary pattern center is marked with a circle in FIG. 10, and the arrow indicates provisional elementary pattern direction. The elementary pattern direction may have a numerical designator (a code), as shown in FIG. 10. An example of placement of elementary patterns in a square tracking area is shown in FIG. 11. It is to be understood that the tracking area may have a shape different from square.

The elementary patterns collectively form unique combinations hereinafter named "constellations". In the VR/AR system, position and orientation of a tracker in space is defined using the "constellations", like in naval, aerial or terrestrial navigation using the stellar sky. In other words, upon detection of elementary pattern unique combinations in a picture obtained from an optical sensor of a tracker within the tracking area, the VR/AR system is able to determine position and orientation of the tracker unambiguously. This is why the task of detection and registration of the "constellations" at the step of adjusting of the optical tracking area prior to start of tracking operations of the VR/AR system is important.

Figure 12A:
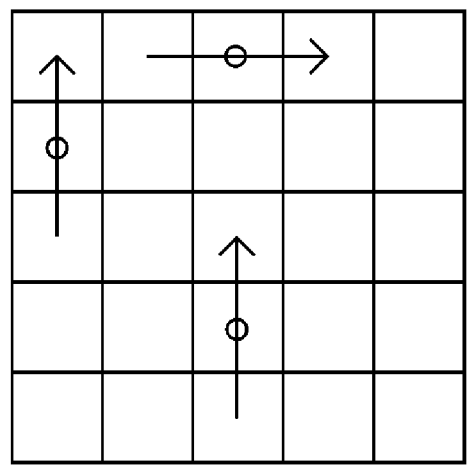
FIG. 12A shows an example of unique combination of elementary optical patterns.
Figure 12B:
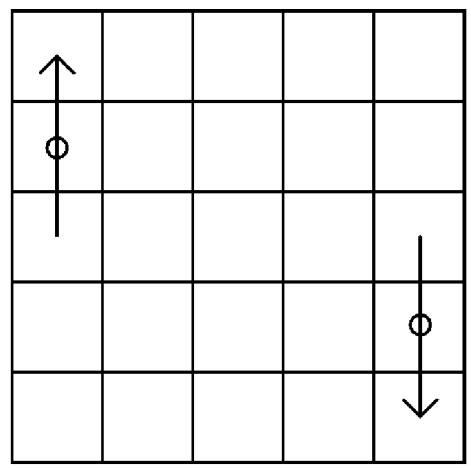
FIG. 12B shows an example of non-unique combination of elementary optical patterns.

Those pattern combinations, which are not unique, are discarded by an algorithm of registration of the "constellations". Examples of unique and non-unique elementary pattern combinations are shown in FIG. 12A and FIG. 12B. The pattern combination of FIG. 12A is unique, whereas the pattern combination of FIG. 12B is not unique, as it is central-symmetrical and rotation of its picture by 180° relative to the picture center yields identical picture, which technologically cannot be distinguished from the initial picture. Thus, the elementary pattern combination of FIG. 12B is not to be used for determination of position and orientation of the tracker and the related moving object.

It is to be understood that generally, the tracking area size may exceed the tracker coverage area. This means that the tracker may obtain a picture of a portion of the tracking area, but not the whole tracking area; the coverage area of the tracker depends on its position and orientation in each time moment. Hereinafter, the tracker coverage area may be called a tracking window. In order to determine position and orientation of the tracker, based on the optical sensor data, it is necessary to have at least one "constellation" within the tracking window.

An algorithm step sequence is described below for registering the "constellations" performed during adjustment of the tracking area, in particular, after its switching on, after its rebooting or changing configuration or changing operational scenario. The algorithm results in a table including records of all "constellations" found within the tracking area. Each record includes an identifier (ID) of a "constellation" and identifiers of elementary patterns, which constitute the "constellation". In an illustrative embodiment of the invention, the "constellation" ID includes coordinates of each elementary pattern of the "constellation"; the coordinates are represented by a number of a cell, where the center of the elementary pattern is located, and a direction of the elementary pattern represented by a rotation code. The elementary pattern identifier is represented by its sequential number defined in configuration file of the tracking area during the area layout configuring. It is to be understood that the "constellation" ID structure may differ from the above-described structure.

Figure 13A:
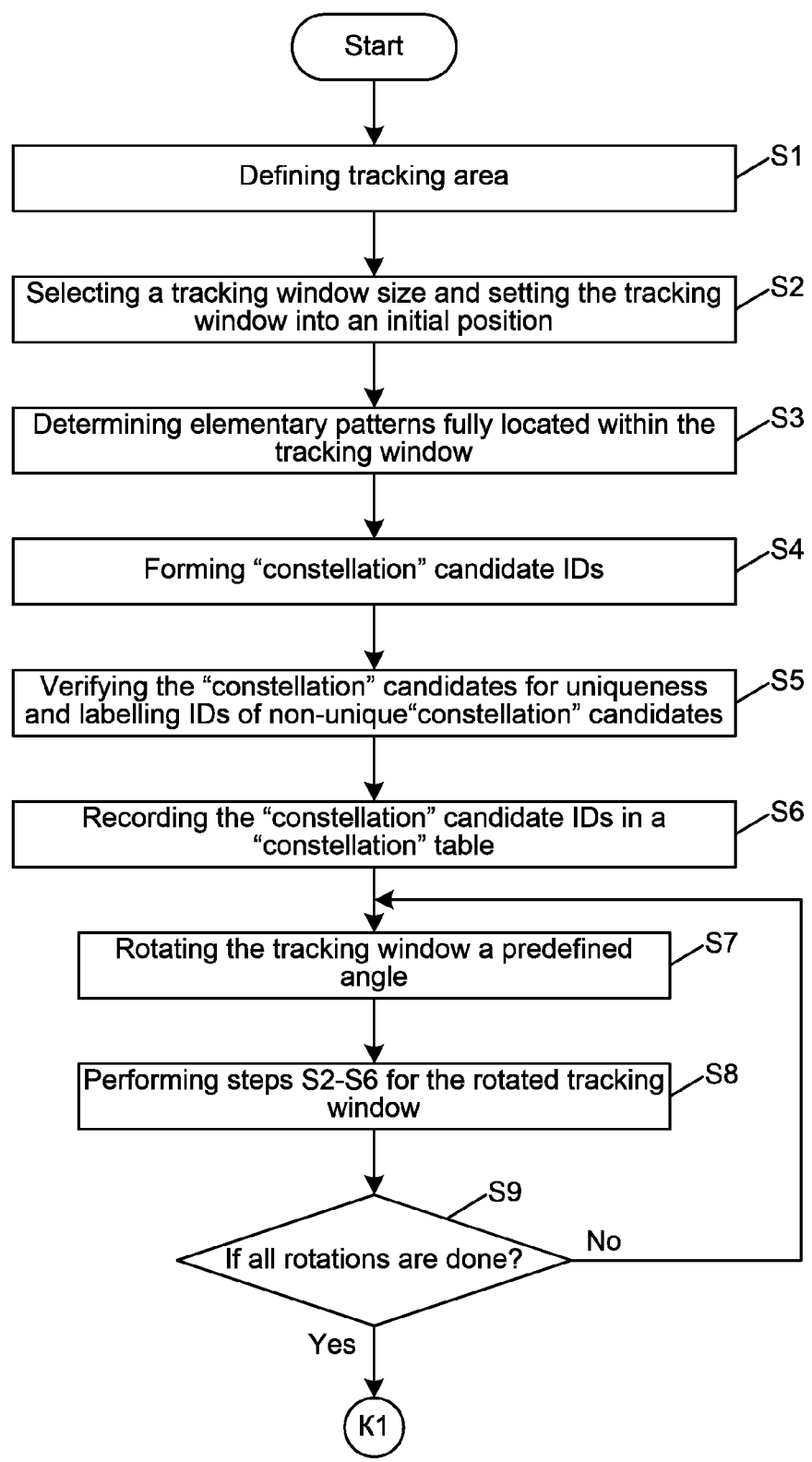
FIGS. 13A, 13B show block diagrams of an algorithm of registration of unique combinations of elementary optical patterns ("constellations").
Figure 13B:
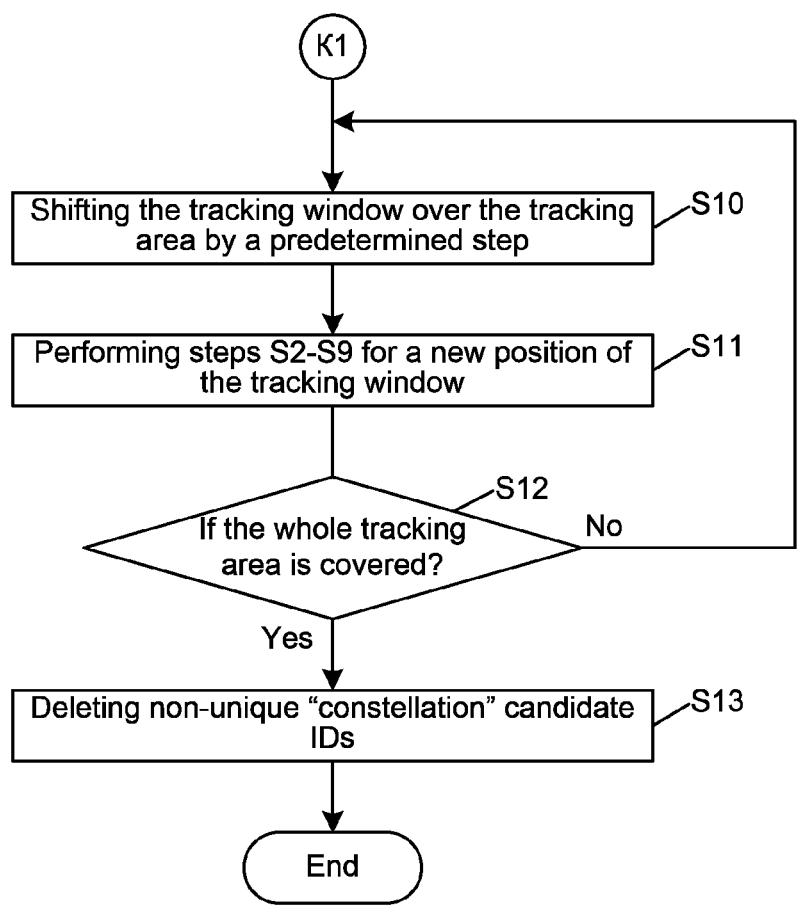

A block diagram of the "constellation" detection and registration algorithm performed during adjustment of the tracking area is shown in FIG. 13A and FIG. 13B.

In step S1, a tracking area to be used during operation of the tracking system is defined. Defining the tracking area may be done by its layout configuring or by reading a ready configuration from the tracking system memory. The concept of the tracking area layout configuring is discussed in earlier patent application PCT/IB2017/058068 and U.S. patent application Ser. No. 15/844,967, owned by the applicant, and incorporated herein by reference in their entirety.

In step S2, a size of the tracking window is selected, based on technical properties of the optical sensor (coverage angle, resolution, etc.), processing speed of the tracking system and maximal allowable complexity of the "constellations" (i.e., maximal allowable number of the elementary patterns constituting one "constellation"), taking into account division of the tracking area into cells.

In an illustrative embodiment of the invention, the tracking window is equal to a square of 4×4 cells (the tracking window is shown by a thick line in FIG. 9). It is possible to have 4×4=16 versions of location of the elementary pattern center (which requires 4 bits) and 4 versions of rotation angle with a pitch of 90° (which requires 2 bits). If maximal complexity of a "constellation" is limited to 8 elementary patterns, then the "constellation" ID length is 8×(4+2)=48 bits.

It is to be understood that the size of 4×4 cells in the illustrative embodiment of the invention is selected for simplicity and better understanding. In a real implementation, the tracking window size depends on physical size of the tracking area, purpose of the VR/AR system, number of users, etc. For instance, the tracking window size may be 6×6 cells or 10×10 cells; in this case, the length of the "constellation" ID is greater as well.

In particular, if the tracking window size is selected to be a square of 6×6 cells, then it is possible to have 6×6=36 versions of location of the elementary pattern center (which requires 6 bits) and 4 versions of rotation angle with a pitch of 90° (which requires 2 bits). If maximal complexity of a "constellation" is limited to 16 elementary patterns, then the "constellation" ID length is 16×(6+2)=128 bits.

Decreasing the maximal "constellation" complexity and reducing the tracking window size allows faster data processing and, therefore, reducing overall response delay of the VR/AR system to the user's actions. However, increasing the maximal "constellation" complexity allows improving reliability of tracking, especially, when markers are shadowed by users in a multi-user VR/AR system. Thus, selection of the tracking window size and the maximal "constellation" complexity is a trade-off process, taking into account all parameters of the VR/AR system.

Further, the tracking window is placed into an initial position. In an illustrative embodiment of the invention, the initial position is the left lower corner of the tracking area. It is to be understood that the initial position may be any other appropriate position.

In step S3, all elementary patterns fully located within the tracking window are determined.

In step S4, an ID of a "constellation" candidate including the elementary patterns located within the tracking window is formed.

Figure 14:
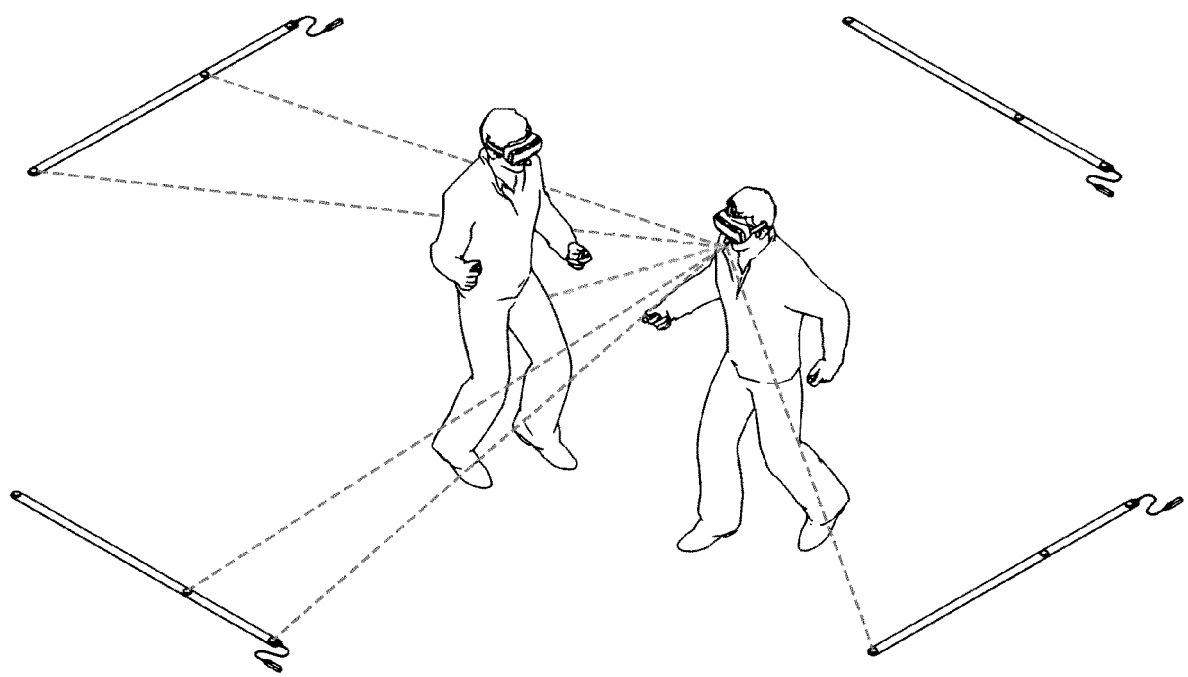
FIG. 14 shows an example of shadowing markers in a multi-user VR/AR system.

During operation of the tracking algorithm (which is described below in detail), a situation is possible, when a picture from the optical sensor does not contain every elementary pattern located within the tracking window. This may be caused by shadowing markers by user's hands or game equipment or by other users in a multi-user VR/AR system (FIG. 14). In particular, if four elementary patterns are located within the tracking window, only three or two of them may be detected in the picture from the optical sensor. Therefore, for each "constellation" candidate ID including N elementary patterns in general, ID of every child "constellation" candidate is formed either, each child including N-1, N-2, N-3, . . . elementary patterns.

Only unique elementary pattern combinations are to be included into a final table of "constellations". If an elementary pattern combination is not unique, it cannot be used in determination of position and orientation of a tracker and a movable object associated with the tracker.

Therefore, in step S5, a "constellation" candidate is verified for its uniqueness; if the table includes an identical "constellation" candidate ID, then this "constellation" candidate ID and its child "constellation" candidate IDs are labelled as non-unique.

Once "constellation" candidate IDs for a current tracking window are formed, they are recorded in the "constellation" table in step S6.

Further, in step S7, the tracking window is rotated by a predefined angle and the steps S2-S6 are repeated for the rotated tracking window in step S8. The rotation is required to verify whether all the "constellation" candidates viewed from various points are unique. In an illustrative embodiment of the invention, the rotation is 90° counterclockwise rotation. It is to be understood that the rotation may be done clockwise and/or using other angle. In step S9, the rotation and the steps S7, S8 are performed several times, until the tracking area gets back to its position before rotation. In particular, the steps S7, S8 have to be performed four times for 90° rotation.

During further operation of the algorithm, the tracking window is shifted over the whole tracking area in step S10, and IDs of "constellation" candidates entirely located in the tracking window are formed for each position of the tracking window in step S11, as it discussed for the steps S2-S9. In an illustrative embodiment of the invention, the shift is a two-cell shift. It is to be understood that the shift pitch may be different, e.g., shift pitch may be equal to one or three cells. In some embodiments of the invention, the shift may have different pitches for vertical and horizontal directions. For instance, the vertical shift pitch may be equal to one cell, while the horizontal shift pitch may be equal to two cells and vice versa.

Further, in step S12, the tracking area coverage is verified and when the entire tracking area is covered during operation of the above-discussed algorithm, all non-unique "constellation" candidate IDs are deleted from the "constellation" table in step S13. Here, formation of the "constellation" table is finished and the "constellation" registration algorithm is stopped.

The problem of automatic adjustment of the tracking area before the tracking system starts operation is solved in the above-discussed manner. A movable object physically associated with the tracker is tracked during further operation of the tracking system, using results of the automatic adjustment.

Figure 15:
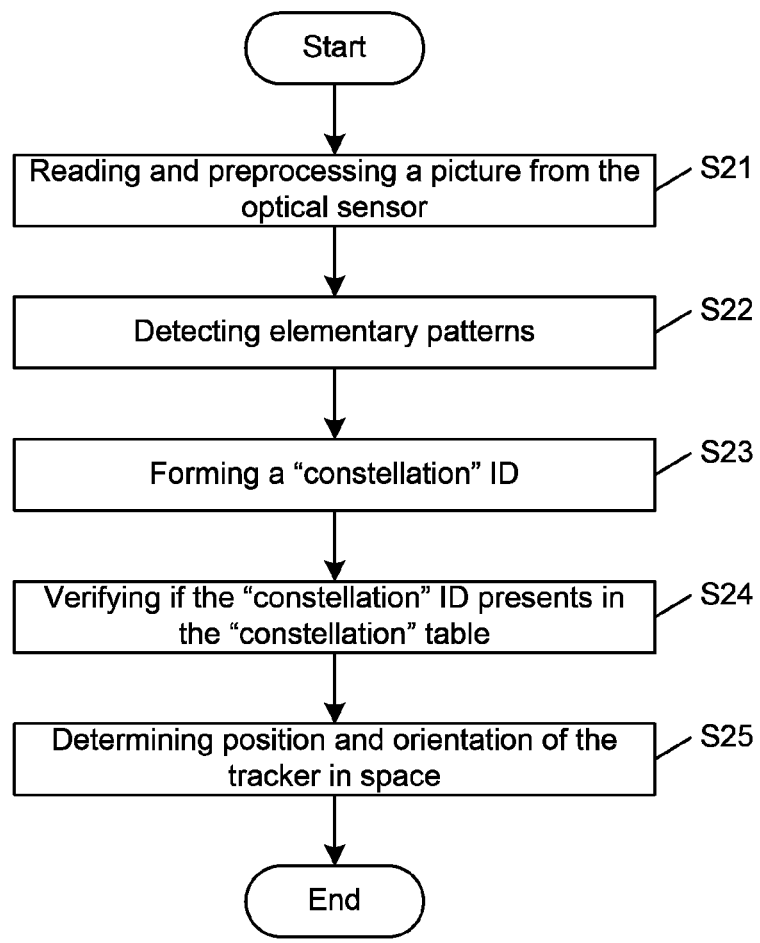
FIG. 15 shows a block diagram of an algorithm of tracking.

In the process of tracking a movable object, a tracking algorithm is performed, whose block diagram is shown in FIG. 15.

In step S21, a picture is read from the optical sensor of the tracker and a preprocessing the picture is performed. An algorithm of the preprocessing is described below in detail with reference to FIG. 20.

In step S22, every elementary pattern that is present in the picture from the optical sensor and entirely located in the tracking window is detected. An algorithm of detecting the elementary patterns is described below in detail with reference to FIG. 21.

In step S23, "constellation" ID is formed for the "constellation" detected in the tracking window. A format of the "constellation" ID is identical and a method of its formation is similar to the described for the "constellation" registration algorithm.

In step S24, the formed "constellation" ID is verified for corresponding to one of the unique combinations of elementary patterns recorded in the "constellation" table during adjustment of the tracking area of the VR/AR system.

In step S25, position and orientation of the tracker in space is determined, based on the identified "constellation" from the "constellation" table. Methods of determination of position and orientation of an object using outer reference points (in particular, methods of navigation using stellar maps) are well known to a person skilled in the art, therefore their description is omitted here for brevity.

Further, upon receiving a new picture from the optical sensor, steps S21-S25 are repeated.

It should be noted that the tracking system must detect at least one "constellation" to determine position and orientation of the tracker and to start tracking the moving object. During further tracking process, when the tracking system is not able to detect one or more "constellations" in a next picture from the optical sensor (e.g., due to shadowing a marker by a user associated with the tracker or by any other user in a multi-user VR/AR system, or due to an inconvenient position of the user in the tracking area at a certain moment of time), it does not cause the tracking system to fail, as the system is able to keep determination of position and orientation of the tracker using inertial tracking, i.e., based on data obtained from inertial sensors, for a time period sufficient for obtaining a new picture from the optical sensor and continuing or restarting the optical tracking.

Moreover, in some embodiments of the invention, continuation of the optical tracking is possible, not only based on the "constellations", but also based on detected individual elementary patterns or even based on individual markers. For instance, as the system is able to determine position and orientation of the tracker only by inertial tracking for some time, then the system may be able to determine nominal positions of individual markers (i.e. points or areas in space, where the markers may be found most likely), based on the tracking area configuration information. In this case, the tracking may be continued by way of detecting individual markers only and comparing their actual positions with their nominal positions. Obviously, reliability of this kind of tracking may be less; however, its use for some time is sufficient for acquiring a picture from the optical sensor containing all "constellations" and may be quite advantageous.

These properties of the tracking system of the invention allow increasing accuracy and reliability of tracking, including a multi-user mode of operation.

In an illustrative embodiment of the invention, the rate of acquiring data from the optical sensor is about 60 frames per second, and the rate of acquiring data from the inertial sensor is about 2000 samples per second. In other embodiments of the invention, the rate of acquiring data from the optical sensor may be increased up to about 400 frames per second. Technical solutions for optical tracking means and inertial tracking means and a way of interaction thereof for solving the discussed problem are disclosed in earlier patent application PCT/IB2017/058068 and U.S. patent application Ser. No. 15/844,967, both owned by the applicant, and both of which are incorporated herein by reference in their entirety.

Figure 20:
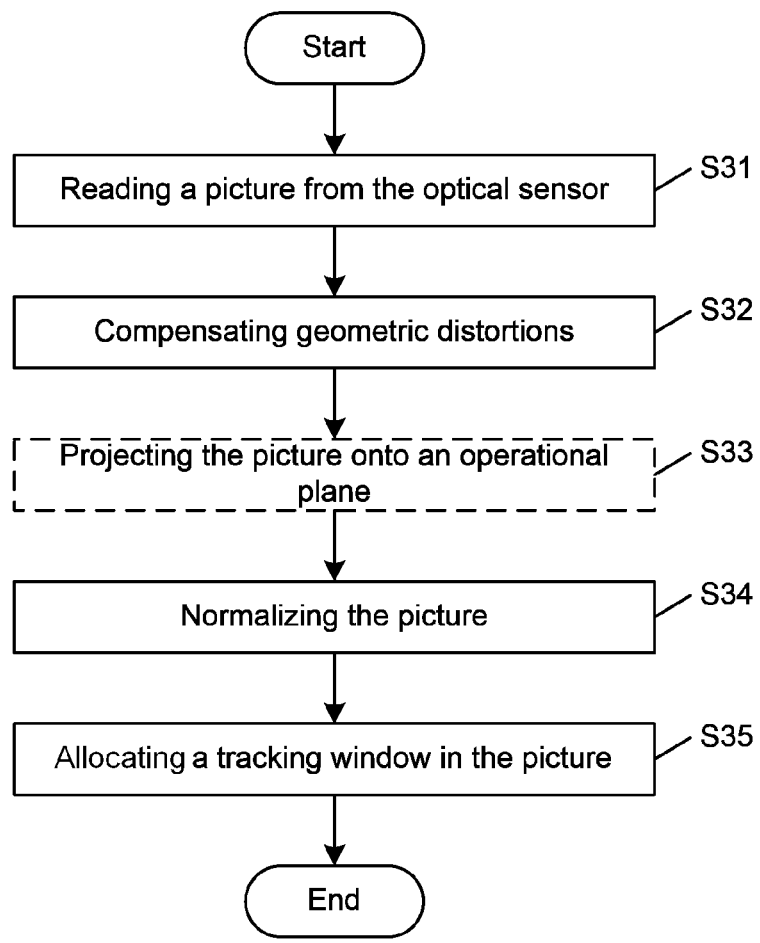
FIG. 20 shows a block diagram of an algorithm of reading and preprocessing pictures obtained from the optical sensor.

Further, an algorithm of reading and preprocessing the pictures is described, referencing to a block diagram of FIG. 20.

Figure 16:
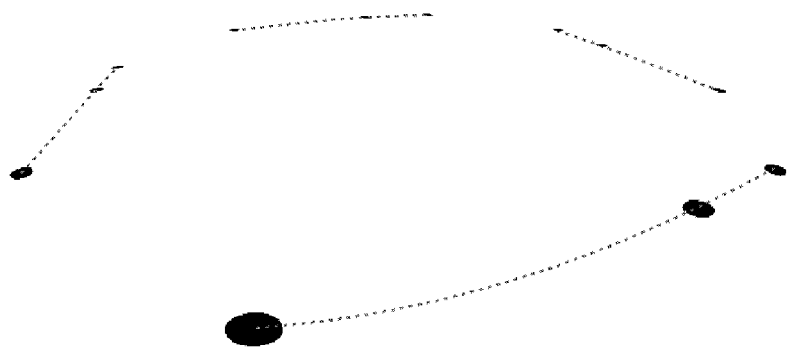
FIG. 16 shows an example of a picture obtained from an optical sensor.

In step S31, reading the picture from the optical sensor is performed. An example of the picture obtained from the optical sensor is shown in FIG. 16. A line connecting emitters of the same elementary pattern is provisionally indicated with the dashed line.

Figure 17:
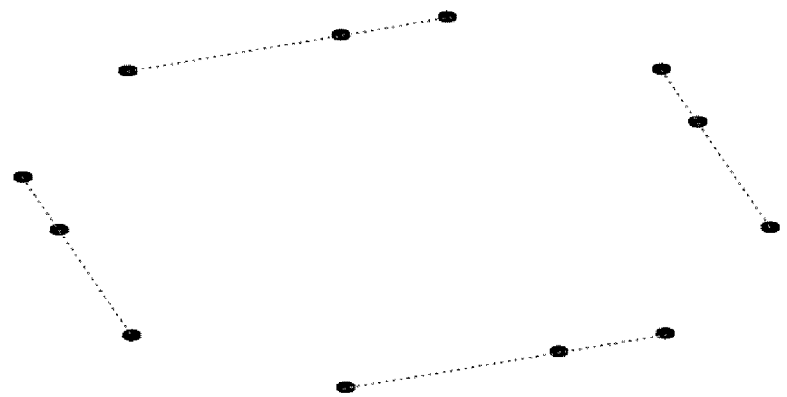
FIG. 17 shows an example of the picture of FIG. 16 after compensation of geometric distortions and projection onto an operational plane.

In step S32, compensation of geometric distortions is performed. The distortions are caused by optics and deviations in dimensions of the optical sensor of the tracker. An example of the picture after compensation of geometric distortions is shown in FIG. 17.

In step S33, the picture after compensation is projected onto an operational plane. This projection is performed, based on direction towards each marker (i.e. a geometric ray) in the coordinate system of the tracker, which data contains the detected marker, and based on a known "upwards" direction, which is determined using data of one or more inertial sensors. This direction may be determined using polar coordinates. A method of determination a ray directed to a certain marker is discussed in earlier patent application PCT/IB2017/058068 and U.S. patent application Ser. No. 15/844,967, both owned by the applicant, and both of which are incorporated herein by reference in their entirety. In some embodiments of the invention, the projection of the picture onto an operational plane may be skipped, in particular, if the markers are already located on the operational plane (e.g., on the floor, which plane is considered as the operational plane).

In an illustrative embodiment of the invention, the "upwards" direction is determined, based on accelerometer data. It is to be understood that the direction may be determined, based on data of another inertial sensor data, e.g., a gyroscope. It may also be determined, based on data of a group of homogeneous or heterogeneous inertial sensors, e.g., an accelerometer and a gyroscope. Methods of determination of the required direction by inertial sensor data are well known to those skilled in the art, therefore their description is omitted here for brevity. Moreover, the "upwards" direction may be determined, based on data of other sensors, e.g., a sensor of electrical field or a sensor of magnetic field.

The plane-projected picture is a projection of the picture obtained from the optical sensor onto a plane, for which the "upwards" direction is normal (i.e. perpendicular), i.e., onto a horizontal plane. In an illustrative embodiment of the invention, the horizontal plane is the floor plane in a room, where the VR/AR system is disposed. This solution is optimal, if the marker strips are located on the floor. It is to be understood that the horizontal plane may be another plane that lies within the tracking area, e.g., the ceiling plane, if the marker strips are located on the ceiling. Pictures projected onto parallel planes are related in mathematical similarity manner and their information values are substantially the same.

Figure 18:
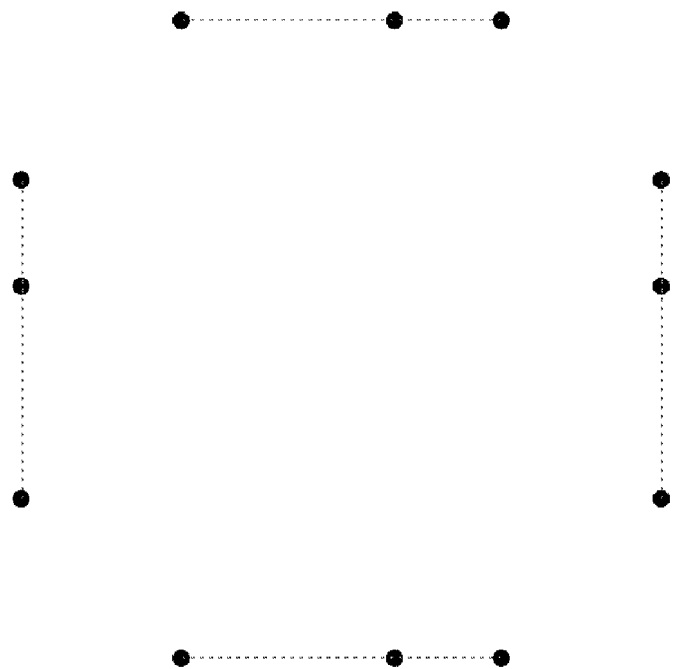
FIG. 18 shows an example of the picture of FIG. 17 after normalizing.
Figure 19:
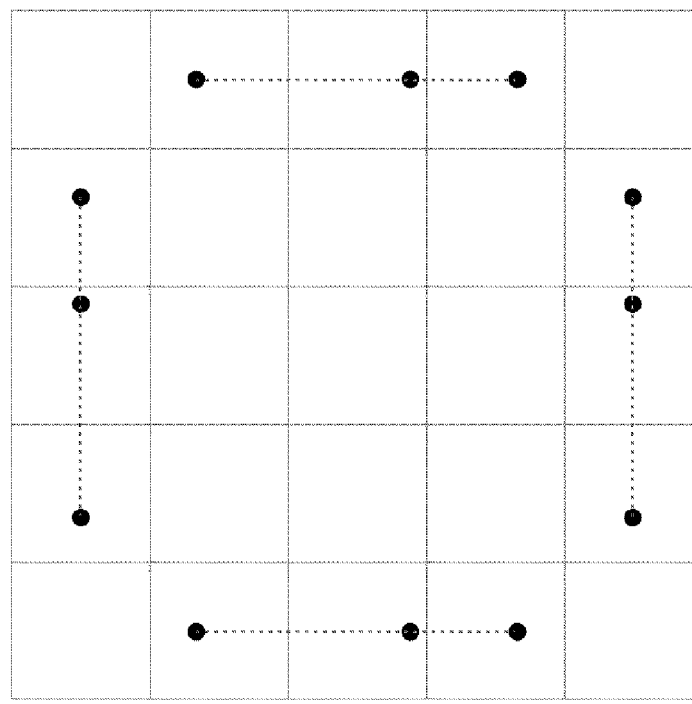
FIG. 19 shows an example of the picture of FIG. 18, where positions of the elementary optical patterns are illustrated relative to a grid.

In step S34, the picture is normalized, i.e., a grid is superimposed upon the picture corresponding to division of the tracking area into cells, as discussed in the above, so as direction of each elementary linear pattern is substantially parallel to one of the grid axes. The picture is also translated, so as the center of each of the elementary linear patterns is placed substantially in the center of a cell. An example of the normalized tracking window picture is shown in FIG. 18; location of the elementary patterns relative to the grid is illustrated in FIG. 19. Methods of processing images in such a way are well known to a person skilled in the art, therefore their description is omitted here for brevity.

In step S35, a tracking window is allocated in the picture, which size and position are the same as those discussed for the step S1 of the algorithm performed during adjustment of the tracking area.

Figure 21:
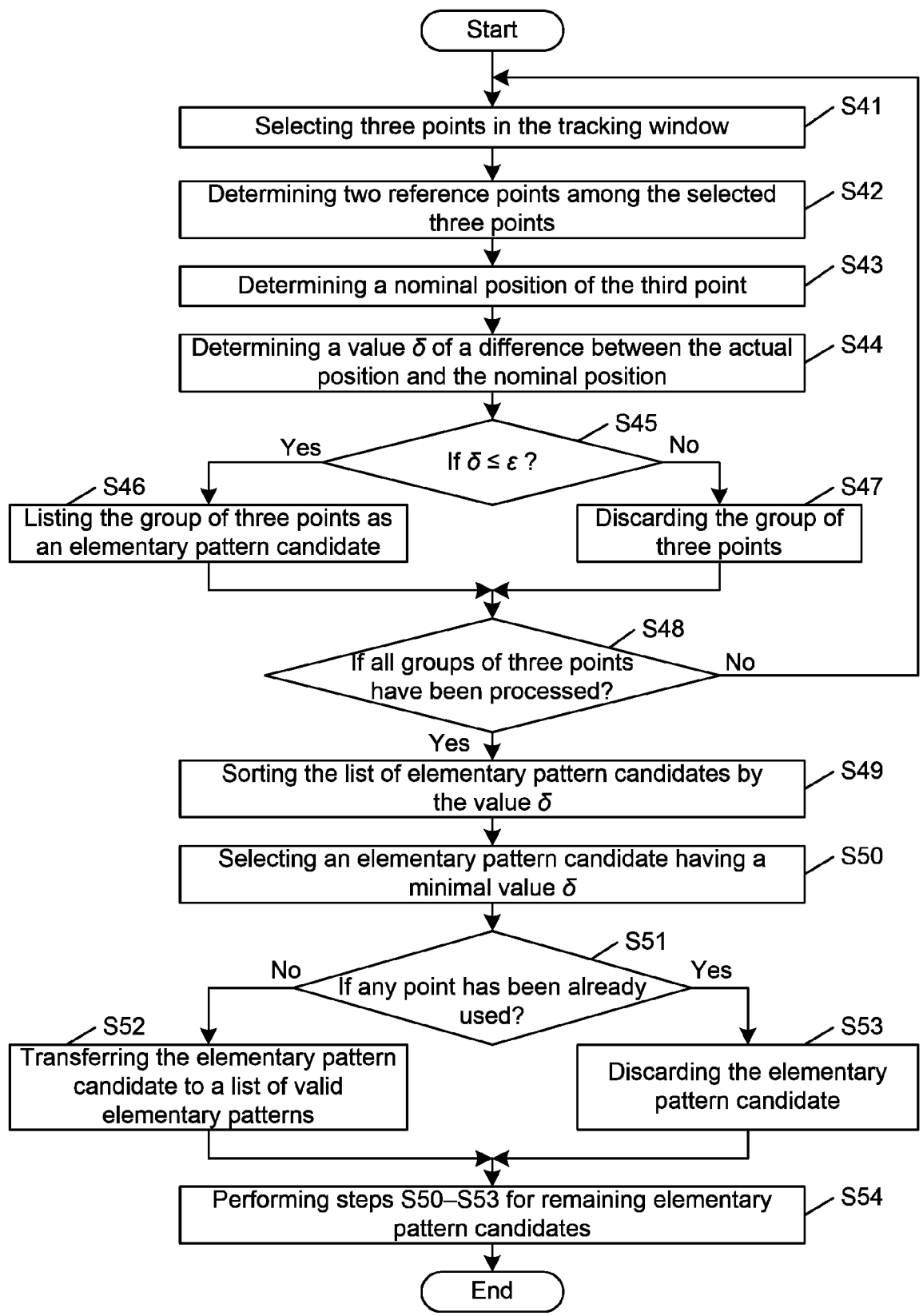
FIG. 21 shows a block diagram of an algorithm of detecting elementary optical patterns in the pictures obtained from the optical sensor.

Further, an algorithm of detection of elementary optical patterns is described referencing to a block diagram of FIG. 21.

In step S41, three points presumably corresponding to the markers are arbitrarily selected in the tracking window.

In step S42, two reference points are determined among the selected three points. The reference points may be, e.g., the most distant points. In another example, the reference points may be the closest points.

In step S43, for the reference points, a nominal position of a third point is determined so as the group of three points corresponds to an elementary pattern.

Figure 22:
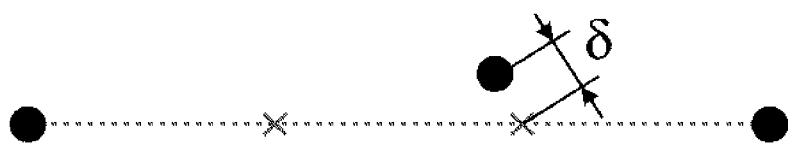
FIG. 22 shows an example of nominal and actual positions of a third point of an elementary optical pattern.

In step S44, a deviation value δ between an actual geometric position of the third point and the nominal position of the third point is determined. FIG. 22 shows an example of the nominal position and the actual position of the third point located between the two most distant points.

In step S45, the deviation value δ is checked. If this deviation does not exceed a predefined threshold value s, then the group of three points is listed as an elementary pattern candidate in step S46; if the deviation exceeds the predefined threshold value E, then the group of three points is discarded, i.e., excluded from a further consideration in step S47.

In step S48, verification if all combinations of three points have been processed in steps S41-S47 is performed.

After completion of processing all combinations of three points found in the tracking window, the list of elementary pattern candidates is sorted in step S49. The sorting is done, based on the value δ, which is used as an indicator of quality of the elementary pattern candidates.

Further, an elementary pattern candidate having a minimal value δ is selected in step S50, and verification if the elementary pattern candidate contains any points already used in valid elementary patterns is performed in step S51. If no one point of the elementary pattern candidate is labelled as used, then this elementary pattern candidate is transferred to a list of valid elementary patterns in step S52. If at least one point of the elementary pattern candidate is labelled as used, then this elementary pattern candidate is discarded, i.e., excluded from a further consideration in step S53. All points of the transferred elementary pattern are labelled as used.

Further, the steps S50-S53 are repeated for the elementary pattern candidates remaining in the list of elementary pattern candidates, in step S54.

It is to be understood that the above-discussed algorithm of detection of elementary optical patterns may be performed in relation of elementary optical patterns consisting of another number of points, e.g., four or five points. The algorithm may be able to break a plurality of elementary optical pattern points into subsets consisting of three points, and to perform the processing as discussed in the above, and then combine the process products. Alternatively, the algorithm may be able to process the whole plurality of points and to determine deviation values $\delta_1$, $\delta_2$, etc.

The algorithm of detection of elementary optical patterns yields the list of valid elementary patterns, further used in the algorithm of registration of the "constellations" and in the tracking algorithm, as described in the above.

In an illustrative embodiment of the invention, the steps S41-S54 of the algorithm of elementary optical pattern detection is described in relation of a linear three-point elementary pattern. It is to be understood that in other embodiments of the invention, the number of points in the elementary pattern may be different from three and may be, e.g., four or five points. Moreover, the shape of the elementary pattern may be different from linear, i.e. the points of the elementary pattern may be positioned not in a line, but they may form a predefined geometric figure.

Figure 23:
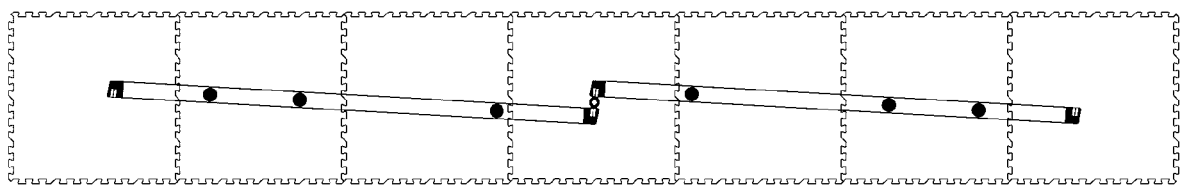
FIG. 23 shows an example of non-collinear position of the elementary optical patterns.

In the above-discussed embodiments of the invention, direction of each linear elementary pattern is chosen to be substantially parallel to one of the grid axes. However, in other embodiments of the invention, the linear elementary patterns may be located in a different manner, e.g., notched like shown in FIG. 23. This kind of layout of the linear elementary patterns allows avoiding situations, when the algorithm of detection of elementary optical patterns erroneously considers an active marker of one linear pattern as an active marker of another (adjacent) linear pattern.

Note that each of the processes corresponding to steps S21-S25 and S41-S54 is performed in respect of data of each tracker independently, i.e., these processes are multi-stream processes and the number of the streams is equal or multiple to the number of trackers in the VR/AR system.

Note that the above discussion covers those actions that are most important for attaining the purpose of the invention. It is to be apparent to those skilled in the art that other actions shall also be done so as to ensure operations of the system, e.g., connecting equipment, its initialization, launching appropriate software, transmitting and receiving instructions and acknowledgements, control data exchanging, synchronizing, etc., and their description is omitted herein for brevity.

Note that the above discussion covers those device components that are most important for attaining the purpose of the invention. It is to be apparent to those skilled in the art that the devices must or may include other parts or portions so as to ensure operations of the VR/AR system, and their description is omitted herein for brevity.

The devices and their component parts, methods and their steps mentioned in the description and shown in the drawings relate to one or more particular embodiments of the invention, when they are mentioned with reference to a numeral designator, or they relate to all applicable embodiments of the invention, when they are mentioned without reference to a numeral designator.

The devices and their parts mentioned in the description, drawings and claims constitute combined hardware/software means, where hardware of some devices may be different, or may coincide partially or fully with hardware of other devices, if otherwise is not explicitly stated. The hardware of some devices may be located in different parts of other devices, if otherwise is not explicitly stated. The software content may be implemented in a form of a computer code contained in a storage device.

The sequence of steps in the method description provided herein is illustrative and it may be different in some embodiments of the invention, as long as the function is maintained and the result is attained.

Parts/components and features of the invention may be combined in different embodiments of the invention, if they do not contradict to each other. The embodiments of the invention discussed in the above are provided as illustrations only and they are not intended to limit the invention, which is defined in claims. All and any reasonable modifications, alterations and equivalent replacements in design, configuration, and mode of operation corresponding to the invention gist are included into the scope of the invention.

Note that the above description relates to use of the method and/or the system for detecting an optical pattern during tracking of a movable object in virtual reality or augmented reality systems, while the method and/or the system are fully applicable in any other industry for solving problems of determination position and/or orientation and/or motion parameters of a movable object.

In particular, the above-discussed engineering solutions may be advantageously employed for tracing cargos and operators in factory logistics, warehouse logistics or store logistics systems, for tracing motions of participants in educational or training systems, for determining position and orientation of endpoints in robotics systems, for handling man-operated or unmanned movable objects, including aircrafts, and for accomplishing various tasks in other systems, related to tracking movable objects, including those currently existing and possibly upcoming in the future.

Having thus described a preferred embodiment, it should be apparent to those skilled in the art that certain advantages of the described method and system have been achieved.

It should also be appreciated that various modifications, adaptations, and alternative embodiments thereof may be made within the scope and spirit of the present invention. The invention is further defined by the following claims.

Related documents, all incorporated herein by reference:
1. R. van Liere, J. D. Mulder. Optical tracking using projective invariant marker pattern properties. DOI: 10.1109/VR.2003.1191138
2. Manuel Loaiza, Alberto Raposo, Marcelo Gattass. A novel optical tracking algorithm for point-based projective invariant marker patterns. ISVC 2007: Advances in Visual Computing, Part I, LNCS 4841, pp. 160-169, 2007.
3. Daniel Wagner, Dieter Schmalstieg. ARToolKitPlus for pose tracking on mobile devices. Computer Vision Winter Workshop, St. Lambrecht, Austria, Feb. 6-8, 2007.
4. Thomas Pintaric, Hannes Kaufmann Affordable infrared-optical pose-tracking for virtual and augmented reality. Proceedings of Trends and Issues in Tracking for Virtual Environments Workshop, 2007.
5. Arjen van Rhijn, Jurriaan D. Mulder. Optical tracking and calibration of tangible interaction devices. IPT & EGVE Workshop, 2005.
6. Klaus Dorfmüller-Ulhaas. Robust optical user motion tracking using a Kalman filter. Report 2003-06, Institut für Informatik, Universität Augsburg, Germany.
7. A. Kolahi, M. Hoviattalab, T. Rezaeian, M. Alizadeh, M. Bostan, H. Mokhtarzadeh. Design of a marker-based human motion tracking system. Biomedical Signal Processing and Control, 2, 2007, pp. 59-67.
8. David Claus, Andrew W. Fitzgibbon. Reliable automatic calibration of a marker-based position tracking system. Proceedings of IEEE Workshop on Motion and Video Computing Motion, 2005, Application of Computer Vision, 2005. WACV/MOTIONS '05 Volume.
9. Steven Maesen, Patrik Goorts, Philippe Bekaert. Scalable optical tracking for navigating large virtual environments using spatially encoded markers. Proceedings of the 19th ACM Symposium on Virtual Reality Software and Technology VRST '13, pp. 101-110.
10. Filippo Bergamasco, Andrea Albarelli, Emanuele Rodola, Andrea Torsello. RUNE-Tag: a high accuracy fiducial marker with strong occlusion resilience. DOI: 10.1109/CVPR.2011.5995544.
11. Leonid Naimark, Eric Foxlin. Encoded LED system for optical trackers. DOI: 10.1109/ISMAR.2005.28.
12. Yashar Deldjoo, Reza Ebrahimi Atani. A low-cost infrared-optical head tracking solution for virtual 3D audio environment using the Nintendo Wii-remote. Entertainment Computing, vol. 12, 2016, pp. 9-27.

The invention claimed is:

1. A method of tracking a moving object, the method comprising the steps of:
automatically adjusting a tracking area by detection and registration of unique combinations of elementary optical patterns, by performing steps S2-S6 as follows:
(S2) determining a size of a tracking window and placing the tracking window in an initial position;
(S3) defining the elementary optical patterns formed by markers within the tracking window;
(S4) forming an ID of a "constellation" candidate, wherein each "constellation" is a combination of elementary optical patterns;
(S5) verifying uniqueness of the "constellation" candidate and labelling the ID of the "constellation" candidate if it is not unique;
(S6) recording the ID of the "constellation" candidate into a "constellation" list; and
tracking a change in position and/or orientation of a moving object by detection of unique combinations of elementary optical patterns and comparison of the elementary optical patterns with the unique combinations of elementary optical patterns registered during the step of automatically adjusting the tracking area.

2. The method of claim 1, wherein the step of automatically adjusting the tracking area further includes the following step before S2:
(S1) defining the tracking area;
and further includes the following steps after S6:
(S7) rotating the tracking window by a predefined angle;
(S8) performing the steps S2-S6 for the rotated tracking window;
(S9) repeating the steps S7, S8 until a required number of rotations has been performed;
(S10) shifting the tracking window by a predefined pitch;
(S11) performing the steps S2-S9 for the shifted tracking window;
(S12) repeating the steps S10, S11 until the tracking area has been entirely covered;
(S13) deleting the non-unique IDs of the "constellation" candidates from the "constellation" list.

3. The method of claim 2, wherein the steps S4, S5, S6 and S13 are performed for each ID of the "constellation" candidate and for each ID of its child "constellation" candidates.

4. The method of claim 2, wherein a projection of the tracking area is divided into cells prior to the step S2, and the size of the tracking window is denominated in a number of the cells in the step S2.

5. The method of claim 1, wherein the step of tracking the change includes the steps of:
(S21) reading a picture from an optical sensor located on the moving object and preprocessing the picture;
(S22) detecting the elementary optical patterns formed by markers within the tracking window;
(S23) forming an ID of a "constellation";
(S24) identifying the ID of the "constellation" using the "constellation" table list; and
(S25) determining position and orientation of the moving object, based on the "constellation" identified in the step S24.

6. The method of claim 5, wherein the reading and preprocessing of step S21 includes the steps of:
(S31) reading the picture from the optical sensor;
(S32) compensating for geometric distortions of the picture;
(S34) normalizing the picture; and
(S35) allocating the tracking window in the picture.

7. The method of claim 5, wherein the step S22 includes the steps of:
(S41) in the tracking window, selecting three points corresponding to the markers;
(S42) determining two reference points among the selected three points;
(S43) for the two reference points, determining a nominal position of a third point, according to an elementary optical pattern;

(S44) determining a deviation value δ between an actual position of the third point and the nominal position of the third point;
(S45) verifying the deviation value δ, and if the deviation value δ does not exceed a predefined threshold value, then, in step (S46), listing a combination of the three points in a list of elementary optical pattern candidates, if the deviation value δ exceeds a predefined threshold value, then, in step (S47), the combination of the three points is discarded;
(S48) repeating the steps S41-S47 until all possible combinations of the three points have been processed;
(S49) sorting the list of elementary optical pattern candidates, based on the deviation value δ;
(S50) selecting an elementary optical pattern candidate having a smallest deviation value δ from the list of elementary optical pattern candidates;
(S51) verifying if any used points present in the elementary optical pattern candidate, and if at least one used point exists therein, then (S52) the elementary optical pattern candidate is discarded, otherwise, if no used points exist therein, then (S53) the elementary optical pattern candidate is listed in a list of valid elementary optical patterns, and all points of the listed elementary optical pattern are labelled used; and
(S54) performing the steps S50-S53 for remaining elementary optical pattern candidates.

8. A system for tracking a moving object, the system comprising:
at least one tracker located on a moving object, the tracker comprising an optical sensor configured to obtain a picture containing one or more elementary optical patterns;
at least one marker strip comprising active markers forming the elementary optical patterns;
a central processing unit configured to perform
(i) automatically adjusting a tracking area by detection and registration of unique combinations of the elementary optical patterns, by performing S2-S6 as follows:
(S2) determining a size of a tracking window and placing the tracking window in an initial position;
(S3) defining the elementary optical patterns formed by markers within the tracking window;
(S4) forming an ID of a "constellation" candidate, wherein each "constellation" is a combination of elementary optical patterns;
(S5) verifying uniqueness of the "constellation" candidate and labelling the ID of the "constellation" candidate if it is not unique;
(S6) recording the ID of the "constellation" candidate into a "constellation" list; and
(ii) tracking a change in position and/or orientation of a moving object by detection of unique combinations of the elementary optical patterns and comparison of the elementary optical patterns with the unique combinations of the elementary optical patterns registered in step (i).

9. The system of claim 8, wherein the optical sensor is a matrix optical sensor.

10. The system of claim 8, wherein at least some of the marker strips are located on a floor or other base structure.

11. The system of claim 10, wherein the marker strips are integrated into resilient puzzle floor mats.

12. The system of claim 8, wherein at least some of the marker strips are located on ceilings, walls, beams, masts, or installed in any other manner above a floor or other base structure within the tracking area.

13. The system of claim 8, wherein the active markers are infrared light-emitting markers.

14. The system of claim 8, wherein the elementary optical pattern is a linear elementary optical pattern.

15. The system of claim 8, wherein the elementary optical pattern is a non-linear elementary optical pattern.

16. The system of claim 8, wherein the tracker is configured to provide data on the active markers found in the picture to the central processing unit.

17. The system of claim 16, wherein the tracker and the central data processing device are connected by a wireless data transmission link configured for transmitting the data on the active markers.

18. The system of claim 16, wherein the tracker further comprises at least one inertial sensor, and the system is configured to track change in position and/or orientation of the moving object based on data of the at least one inertial sensor when the marker data is insufficient.

19. The method of claim 6, further comprising (S33) projecting the image onto an operational plane between the steps S32 and S34.

20. The system of claim 8, wherein the automatically adjusting the tracking area further includes the following before S2:
(S1) defining the tracking area; and
further includes the following after S6:
(S7) rotating the tracking window by a predefined angle;
(S8) performing S2-S6 for the rotated tracking window;
(S9) repeating S7, S8 until a required number of rotations has been performed;
(S10) shifting the tracking window by a predefined pitch;
(S11) performing S2-S9 for the shifted tracking window;
(S12) repeating S10, S11 until the tracking area has been entirely covered;
(S13) deleting the non-unique IDs of the "constellation" candidates from the "constellation" list.

* * * * *